(12) United States Patent
Chu et al.

(10) Patent No.: US 11,704,530 B2
(45) Date of Patent: Jul. 18, 2023

(54) PHYSICAL CARD WITH EMBOSSED CHARACTERS FOR IMPROVED SECURITY

(71) Applicant: Capital One Services, LLC, McLean, VA (US)

(72) Inventors: Jennifer Chu, San Francisco, CA (US); Alexander Golovanov, Lafayette, CA (US); Jonatan Yucra Rodriguez, Allentown, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/401,351

(22) Filed: Aug. 13, 2021

(65) Prior Publication Data

US 2023/0052459 A1  Feb. 16, 2023

(51) Int. Cl.
*G06K 19/077* (2006.01)
*G06K 19/06* (2006.01)

(52) U.S. Cl.
CPC ... *G06K 19/0772* (2013.01); *G06K 19/06196* (2013.01)

(58) Field of Classification Search
CPC ........... G06K 15/1247; G06K 7/10831; G06K 7/10861; G06K 19/0772; G06K 19/06196;

(Continued)

(56) References Cited

U.S. PATENT DOCUMENTS

| 4,255,380 A | 3/1981 | Bjorkland |
| 6,001,456 A | 12/1999 | Newland |

(Continued)

FOREIGN PATENT DOCUMENTS

| CA | 2636672 A1 | 1/2010 | |
| EP | 3499425 A1 * | 6/2019 | ....... G06K 19/07716 |

(Continued)

OTHER PUBLICATIONS

Michaud et al., "The development of a database for payment card embossing machines" (Year: 1998).*

(Continued)

*Primary Examiner* — Thien T Mai
(74) *Attorney, Agent, or Firm* — Troutman Pepper, Hamilton Sanders LLP; Christopher J. Forstner; John A. Morrissett

(57) ABSTRACT

A physical card may include a substantially planar body that may include a front surface, a back surface, and one or more side surfaces. The front surface may include a background formed primarily in a first color, and a plurality of embossed characters each having one or more front surfaces aligned substantially in parallel relative to the background. The plurality of embossed characters may include one or more side surfaces extending from the background at a lower edge to the front surface at an upper edge, wherein the one or more front surfaces of at least a first embossed character of the plurality of embossed characters are formed primarily in a second color different from the first color and the one or more side surfaces of at least the first embossed character are formed primarily in the first color to limit a viewing angle of the plurality of embossed characters.

20 Claims, 10 Drawing Sheets

(58) Field of Classification Search
CPC .............. B29C 67/08; B29C 45/14655; H01L 25/0753; H01L 33/62; H01L 33/60; H01L 33/52; H01L 2224/8592; H05K 2201/09063; H05K 1/183; H05K 2201/09072; C09K 11/7734; C09K 11/7774

See application file for complete search history.

(56) References Cited

U.S. PATENT DOCUMENTS

| | | |
|---|---|---|
| 7,468,203 B2 | 12/2008 | Hicks et al. |
| 2002/0018430 A1* | 2/2002 | Heckenkamp ... G06K 19/06046 369/109.01 |
| 2005/0174529 A1 | 8/2005 | Fukushima et al. |
| 2008/0314441 A1 | 12/2008 | Mather |
| 2010/0025475 A1* | 2/2010 | Webb .................. G06K 19/022 235/491 |
| 2010/0124363 A1 | 5/2010 | Ek et al. |
| 2014/0044303 A1* | 2/2014 | Chakraborti ....... H04N 1/00864 382/100 |

FOREIGN PATENT DOCUMENTS

| | | |
|---|---|---|
| GB | 2382053 A | 5/2003 |
| WO | 2003106158 A2 | 12/2003 |
| WO | 2004042167 A1 | 5/2004 |
| WO | 2015185083 A1 | 12/2015 |

OTHER PUBLICATIONS

Pathak et al., "Automated Teller Machine (ATM) Frauds and Security" (Year: 2015).*

* cited by examiner

PHYSICAL CARD WITH EMBOSSED CHARACTERS FOR IMPROVED SECURITY

FIELD OF INVENTION

The disclosed technology generally relates to physical cards, and more particularly to techniques for selectively limiting the visibility of sensitive information on the physical cards for improved security.

BACKGROUND

Physical cards such as transaction cards, identification cards, and the like often contain sensitive information (e.g., cardholder name and personal information, card number, expiration date, card verification value, etc.) that is sometimes needed to complete a transaction or interaction with law enforcement, government agencies, and/or merchants. Traditional cards display this sensitive information on the front or back surfaces of the card for viewing by a person in possession of the card. While this allows the cardholder or an authorized person in possession of the card (e.g., a restaurant server collecting a transaction card, a merchant selling alcoholic beverages to the cardholder, etc.) to view the necessary information, as is desired by the cardholder, it also risks exposure of the sensitive information to bystanders proximate the cardholder or authorized person.

Accordingly, there is a need for physical cards and supporting techniques for selectively limiting the visibility of sensitive information on the cards for improved security. The disclosed physical cards and techniques are directed to these and other considerations.

BRIEF SUMMARY

The disclosed technology includes physical cards and supporting techniques for selectively limiting the visibility of sensitive information on the physical cards for improved security. In certain example implementations, the disclosed technology includes a physical card (e.g., a transaction card, identification card, etc.) having a substantially planar body that is bounded by a continuous peripheral edge. The body may include a front surface, a back surface, and one or more side surfaces. The card's front surface may include a background formed primarily in a first color (e.g., white), and a plurality of embossed characters (e.g., numbers, letters, etc.) that may contain sensitive information (e.g., cardholder name, social security number, account number, etc.). Each embossed character may have one or more front surfaces aligned substantially in parallel relative to the background, and one or more side surfaces extending from the background at a lower edge to the front surface at an upper edge. The one or more front surfaces of at least a first embossed character of the plurality of embossed characters may be formed primarily in the first color and/or a second color different from the first color (e.g., black). The one or more side surfaces of at least the first embossed character may be formed primarily in the first color to limit a viewing angle of the plurality of embossed characters. That is, the cardholder (or another authorized person) may easily view the sensitive information displayed on the card when he or she looks at the card from a straight-on, or 90-degree, vantage point. However, unauthorized persons standing near the cardholder (e.g., in a store checkout line) would have a more difficult time reading the sensitive information displayed on the card at an angle where the side surfaces of the embossed characters blend in with the card background, i.e., from any non-optimal viewing angle.

In some embodiments, the card's front surface may include a computer-readable chip for conducting transactions. The card's front surface may also include one or more non-embossed characters that may contain non-sensitive information (e.g., merchant logo, card carrier, etc.). The one or more non-embossed characters may be formed primarily in the first and/or second color.

In some embodiments, the one or more side surfaces of the plurality of embossed characters may include a first material (e.g., metal, glass, etc.). The one or more front surfaces of the plurality of embossed characters may include a second material having one or more different visual properties from the first material (e.g., transparency, translucency, reflectiveness, etc.). This embodiment provides a significant benefit of added security as unauthorized persons would have a difficult time deciphering the sensitive information displayed on the card from non-optimal viewing angles due to the card's multiple visual properties.

In some embodiments, each embossed character may have one or more outer side surfaces extending from an outer lower edge proximate the background to an upper edge of a lip protruding beyond the front surfaces of the plurality of embossed characters. The one or more outer side surfaces may be formed in the first color and/or the second color. Each embossed character may also have one or more inner side surfaces extending from an inner lower edge proximate the one or more front surfaces of the plurality of embossed characters to the upper edge of the lip. The one or more inner surfaces may be formed in the first color and/or the second color. Once again, the cardholder may easily view the sensitive information displayed on the card when the cardholder looks at the card from a 90-degree vantage point. However, unauthorized persons standing near the cardholder would have a significantly more difficult time reading the sensitive information displayed on the card from non-optimal viewing angles as the front surfaces of the embossed characters are at least somewhat shielded by the protruding surfaces. Further, depending on whether the front surfaces of the embossed characters are formed in the first or second color (or even a third color), unauthorized persons would have greater difficulty reading the sensitive information from non-optimal viewing angles, as the front surfaces of the embossed characters may blend into other card features.

In some embodiments, the card's front surface may include a plurality of embossed characters each having one or more front surfaces aligned substantially non-parallel relative to the card background such that the sensitive information displayed on the card may not be readable from a single vantage point. The cardholder would need to move the card around in order to fully make out each embossed character. This embodiment provides a significant benefit of added security as unauthorized persons would not have an opportunity, like the cardholder, to move the card in all directions to make out the full string of embossed characters.

In some embodiments, the one or more lips of the plurality of embossed characters may be skewed. That is, the one or more lips may be, for example, shorter on the left, taller on the right, etc. This embodiment would create a unique non-optimal viewing angle for each embossed character, thus further limiting viewing of sensitive information from non-optimal angles.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures, which are not necessarily drawn to scale, and wherein.

DETAILED DESCRIPTION

Figure 1A:
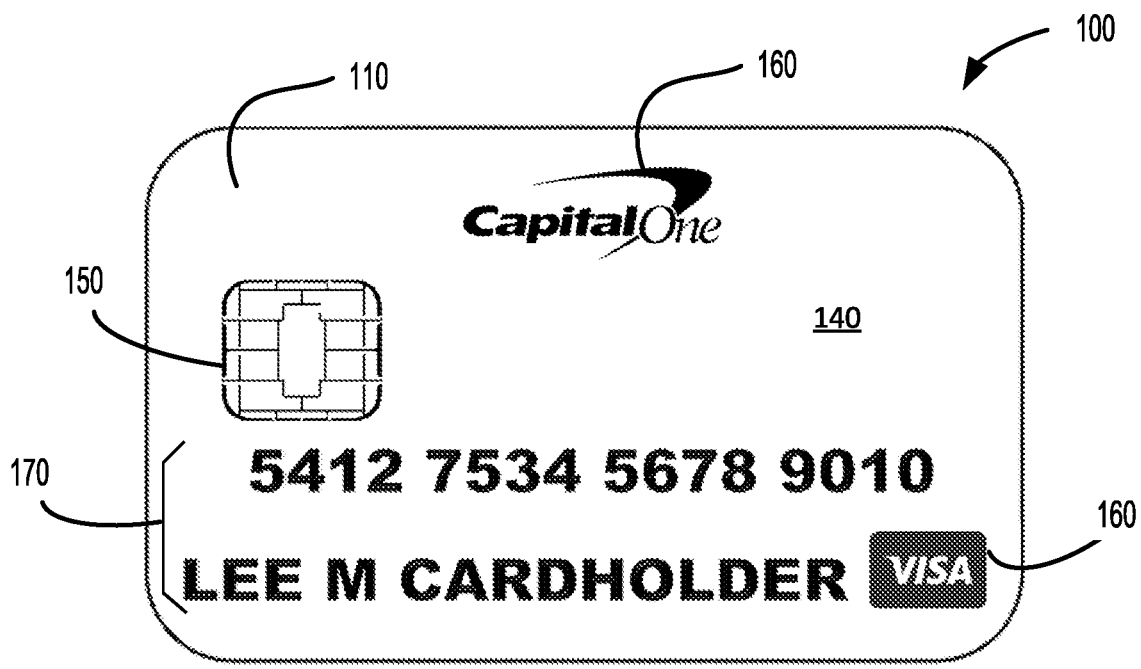
FIGS. 1A-1D show an example of a physical card configured to selectively limit visibility of sensitive information on the card surface, in accordance with one or more aspects of the disclosure.

Some implementations of the disclosed technology will be described more fully with reference to the accompanying drawings, which form a part hereof, and in which is shown by way of illustration various example embodiments in which aspects of the disclosure may be practiced. It is to be understood that other embodiments may be utilized, and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to physical cards and supporting techniques for selectively limiting the visibility of sensitive information on the cards for improved security. For example, some embodiments describe techniques that may prevent sensitive information displayed on physical cards from being read from certain vantage points, e.g., a person standing in a line behind a cardholder. These may provide advantages over other techniques by improving security of the sensitive information to help prevent bystanders or unauthorized persons from viewing it. As such, the following discussion describes several exemplary techniques for selectively limiting the visibility of sensitive information on a physical card.

FIGS. 1A-1D provide an example of a physical card 100 configured to selectively limit visibility of sensitive information on the card surface. FIGS. 1A-1D are described simultaneously herein, as each sub-figure shows the same physical card 100 yet displayed at different angles in relation to a cardholder in possession of physical card 100. That is, FIG. 1A displays physical card 100 at a 90-degree angle with respect to a cardholder, FIG. 1B displays physical card 100 at a 0-degree angle with respect to a cardholder, FIG. 1C displays physical card 100 at a 60-degree angle with respect to a cardholder, and FIG. 1D displays physical card 100 at a 30-degree angle with respect to a cardholder. The depiction of these various angles is provided to illustrate how visibility of sensitive information displayed on physical card 100 would change depending on vantage point. Other figures and embodiments included within this specification may be described and illustrated in a similar fashion.

Physical card 100 may be of a standard size (or a non-standard size) and made of a substrate, such as plastic, metal, etc. Physical card 100 may be any suitable card configured to permit a cardholder to access sensitive information. In this regard, physical card 100 may be a transaction card, an identification card, or the like. In some embodiments, physical card 100 may provide access to one or more types of accounts. For instance, physical card 100 may allow a cardholder to select from a credit card option and/or a debit card option. As shown in FIGS. 1A-1D, physical card 100 may include a front surface 110, a back surface 120, one or more side surfaces 130, a background 140, a computer-readable chip 150, one or more non-embossed characters 160, and a plurality of embossed characters 170. In some embodiments, physical card 100 may also include a magnetic strip.

Background 140 may be formed primarily in one or more colors (e.g., white, black, blue, etc.) and/or one or more materials (e.g., plastic, metal, glass, etc.). The one or more materials may have different visual properties, such as transparency, translucency, reflectiveness, and the like. Background 140 may be formed as such in order to either blend in with or provide contrast with one or more other features of physical card 100, e.g., non-embossed characters 160, embossed characters 170, etc.

Chip 150 may be a smart chip or an integrated circuit. In this regard, chip 150 may include a microprocessor and memory, such as read only memory (ROM) and random-access memory (RAM). Additionally, chip 150 may include one or more contact pads to receive voltage to power the physical card 100 and exchange signals with a terminal. In some embodiments, chip 150 may be configured to execute one or more applications. The applications may allow chip 150 to process payments, for example, using a payment application. For example, chip 150 may verify a cardholder via a method supported by the terminal and agreed upon by chip 150. Additionally, chip 150 may confirm the transaction, for example, by verifying the cardholder, determining any processing restrictions, authenticating offline data associated with the cardholder, or any combination thereof. In some instances, the terminal may determine that the transaction is required to be processed online processing. In these instances, chip 150 may generate a request authorization that is transmitted to the issuer, via the terminal. In other examples, one or more applications may allow chip 150 to determine whether a current transaction is a duplicate of an earlier transaction. In further examples, one or more applications may allow chip 150 to perform cryptographic processing, authenticate physical card 100, define risk management parameters (e.g., when the transaction may be conducted offline), digitally sign payment data, and verify the cardholder. Additionally, or alternatively, chip 150 may be a dual interface chip that provides for contact and contact-less interfaces.

Non-embossed characters 160 may contain non-sensitive information, such as merchant or other entity identifiers (e.g., merchant logo, card carrier, etc.). Non-embossed characters 160 may be formed primarily in one or more colors and/or one or more materials. Non-embossed characters 160 may be formed as such in order to either blend in with or provide contrast with one or more other features of physical card 100, e.g., background 140, embossed characters 170, etc.

Embossed characters 170 may contain sensitive information, such as personal information (e.g., name, address, social security number, etc.), financial information (e.g., card number, cardholder name, an expiration date, a validation code, etc.), and the like. Embossed characters 170 may be configured to each have one or more front surfaces 172 aligned substantially in parallel relative to background 140, making it easiest to view sensitive information displayed in embossed characters 170 from a 90-degree vantage point (FIG. 1A), that is, a cardholder's (or other authorized person's) perspective. Front surfaces 172 may be formed primarily in one or more colors and/or one or more materials in order to either blend in with or provide contrast with one or more other features of physical card 100, e.g., background 140. Embossed characters 170 may also have one or more side surfaces 174 extending from background 140 at a lower edge to front surfaces 172 at an upper edge. Side surfaces 174 may be formed primarily in one or more colors and/or one or more materials in order to either blend in with or provide contrast with one or more other features of physical card 100, e.g., background 140, front surfaces 172, etc.

FIGS. 1A-1D provide one such example where background 140 and side surfaces 174 are formed primarily in white, while front surfaces 172 are formed primarily in black. This color contrast helps to limit a viewing angle of embossed characters 170. That is, as the viewing angle changes from a 90-degree to 0-degree vantage point, as illustrated in FIGS. 1A-1D, visibility of sensitive information displayed on the card becomes more limited. Specifically, these embodiments show that as the viewing angle decreases, side surfaces 174 blend in more with background 140, while front surfaces 172 appear to blend with one another, making the sensitive information, e.g., card number and cardholder name, increasingly more difficult to read.

Additionally, different features of physical card 100 may be formed primarily in one or more materials, each material providing a unique visual property, in order to further limit viewing of sensitive information displayed on the card. For example, background 140 and front surfaces 172 may both be formed primarily in a similarly transparent or translucent material, while side surfaces 174 may be formed primarily in a reflective material to provide contrast. This embodiment provides a significant benefit of added security as unauthorized persons would have a difficult time deciphering the sensitive information displayed on the card from non-optimal viewing angles due to the card's multiple visual properties.

In other embodiments, lenticular printing may be applied to one or more features of physical card 100. For example, background 140 and front surfaces 172 may both be formed primarily in a transparent or translucent material overlaying a lenticular printed design, while side surfaces 174 may be formed primarily in a reflective material or colored in contrast to the lenticular printed design to help make side surfaces 174 easier to view. This embodiment provides a significant benefit of added security as unauthorized persons would have a difficult time deciphering the sensitive information displayed on the card from non-optimal viewing angles due to the card's multiple visual properties. Lenticular printing relies on unique optical phenomena as perceived by a viewer. Each lenticular print is usually based on a number of images, each sliced into strips, which are then interlaced with one or more other images. The lenses are lined up with each image interlace, so that light reflected off, or transmitted through, each strip is refracted in a slightly different direction, but the light from all strips of a given image are sent in the same direction. The end result is that a single eye or camera looking at the print sees a single whole image, but an eye or camera with a different angle of view will see a different image. As such, lenticular printing has an extremely low tolerance level for misalignment of image strips relative to the lenticular lenses through which the images are seen. In practice, the lenticular print on one or more features of physical card 100 could include a design or logo on background 140 from a first viewing angle (e.g., looking at the card head on at 90 degrees) that becomes a contrasting color (e.g., black) with the color (e.g., white) of front surfaces 172 at a second viewing angle (e.g., with the bottom of the card tilted upwardly 30 degrees or more). In this manner, tilting the bottom of card 100 upwardly would allow the cardholder to more easily read front surfaces 172. Similarly, in another example, a design or logo may be present on background 140 and the lenticular print may only be on front surfaces 172 such that, at a first viewing angle, the lenticular print fits in as part of the overall design/logo and, at a second viewing angle, the lenticular print contrasts from the overall design/logo. In this manner, tilting card 100 to a predetermined viewing angle may allow the cardholder to more easily read front surfaces 172 while bystanders at other viewing angles would merely see an, e.g., American flag design that includes front surfaces 172 (some of which are stars in white and blue while others are red and white stripes) such that no characters readily stand out.

FIGS. 2A-2D provide another example of a physical card 200 configured to selectively limit visibility of sensitive information on the card surface. For purposes of this embodiment, it should be understood that many of the features of physical card 200 are similar to those of physical card 100. That is, physical card 200 may also include a front surface 210, a back surface 220, one or more side surfaces 230, a background 240, a computer-readable chip 250, one or more non-embossed characters 260, a plurality of embossed characters 270, and a magnetic strip, as described above with respect to FIGS. 1A-1D.

FIGS. 2A-2D also provide, however, an additional technique for selectively limiting the visibility of sensitive information on physical card 200. That is, physical card 200 may also include embossed characters 280 that are a subset of embossed characters 270 (e.g., the last four digits of a card number). Embossed characters 280, or features thereof, may be formed primarily in a different color and/or material with respect to one or more other features of physical card 200, e.g., background 240, embossed characters 270, etc. For example, in FIGS. 2A-2D, background 240, front surfaces 272 and side surfaces 274 of embossed characters 270, and side surfaces 284 of embossed characters 280 are formed primarily in white. Front surfaces 282 of embossed characters 280, however, are formed primarily in black. This embodiment provides a benefit of increased security by allowing for greater visibility of non-sensitive information (e.g., the last four digits of the card number, "9010"), while providing limited visibility of sensitive information (e.g., the first twelve digits of the card number and the cardholder name) from certain vantage points. That is, while a cardholder would be able to make out any information displayed on physical card 200 from a 90-degree vantage point (FIG. 2A), unauthorized persons would have an increasingly more difficult time viewing at least sensitive information displayed on physical card 200 as the viewing angle decreases (FIGS. 2B-2D), as many of the card's features blend together.

FIGS. 3A-3D provide another example of a physical card 300 configured to selectively limit visibility of sensitive information on the card surface. For purposes of this embodiment, it should be understood that many of the features of physical card 300 are similar to those of physical card 100. That is, physical card 300 may also include a front surface 310, a back surface 320, one or more side surfaces 330, a background 340, a computer-readable chip 350, one or more non-embossed characters 360, a plurality of embossed characters 370, and a magnetic strip, as described above with respect to FIGS. 1A-1D.

FIGS. 3A-3D also provide, however, an additional technique for selectively limiting the visibility of sensitive information on physical card 300. That is, physical card 300 may also include plurality of embossed characters 370 that each have one or more outer side surfaces 374 that extend from an outer lower edge proximate background 340 to an upper edge of a lip protruding beyond front surfaces 372 of embossed characters 370. Outer side surfaces 374 may be formed primarily in a different color and/or material with respect to one or more other features of physical card 300, e.g., background 340, front surfaces 372, etc. Embossed characters 370 may also each have one or more inner side surfaces 376 that extend from an inner lower edge proximate front surfaces 372 to the upper edge of the lip. Inner side surfaces 376 may be formed primarily in a different color and/or material with respect to one or more other features of physical card 300, e.g., background 340, front surfaces 372, outer side surfaces 374, etc.

Figure 3A:
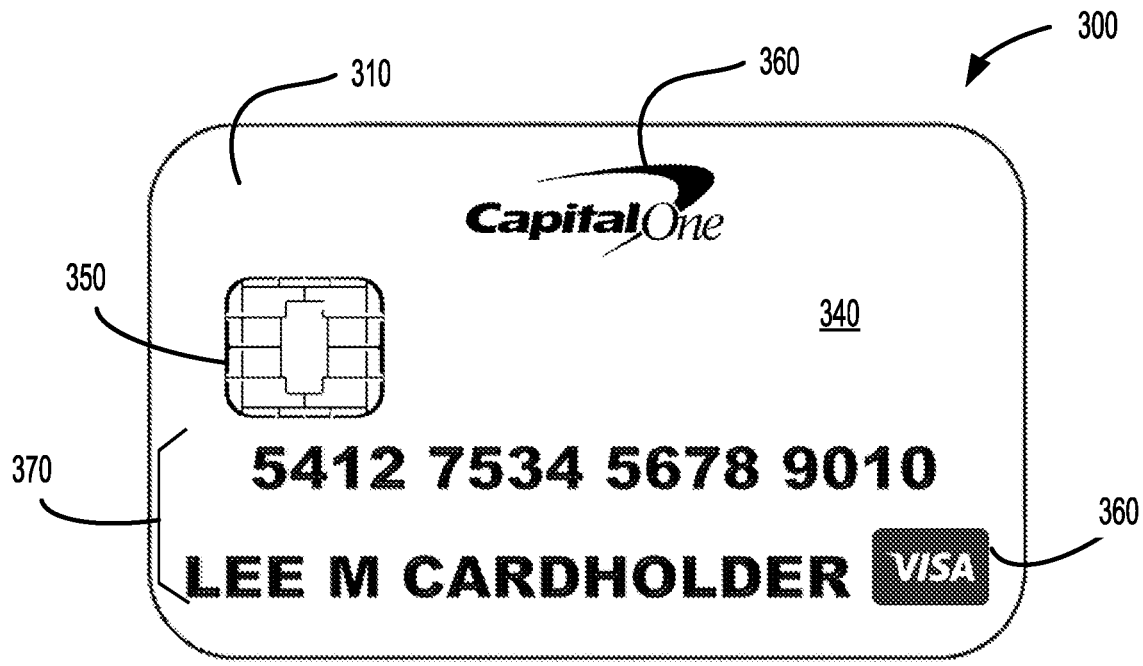
FIGS. 3A-3D show another example of a physical card configured to selectively limit visibility of sensitive information on the card surface, in accordance with one or more aspects of the disclosure.
Figure 3B:
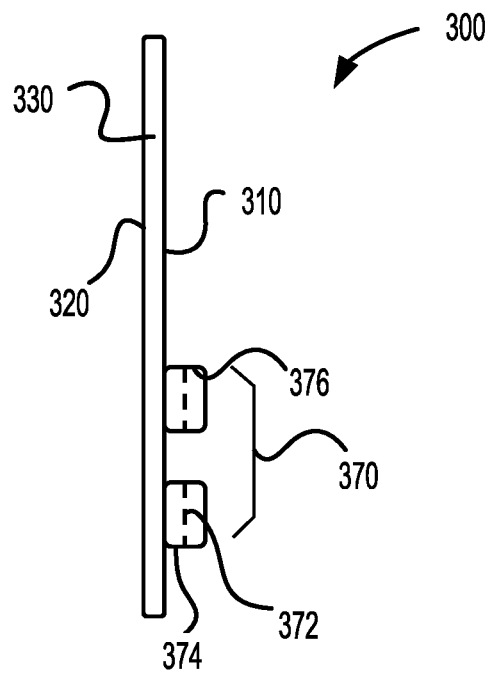
Figure 3C:
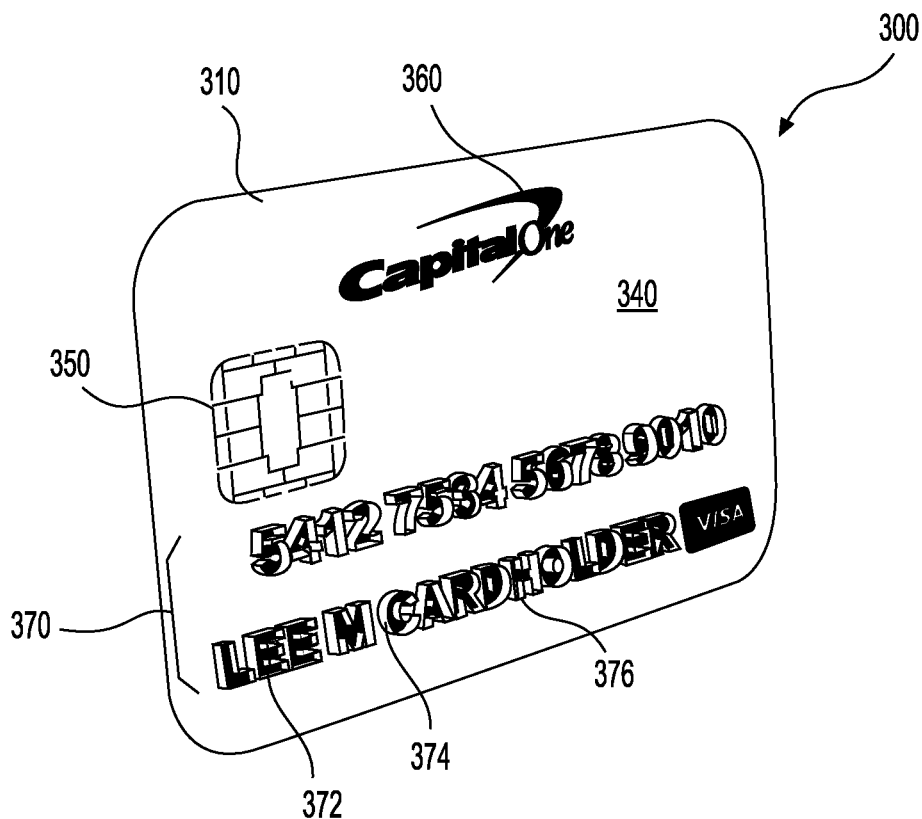
Figure 3D:
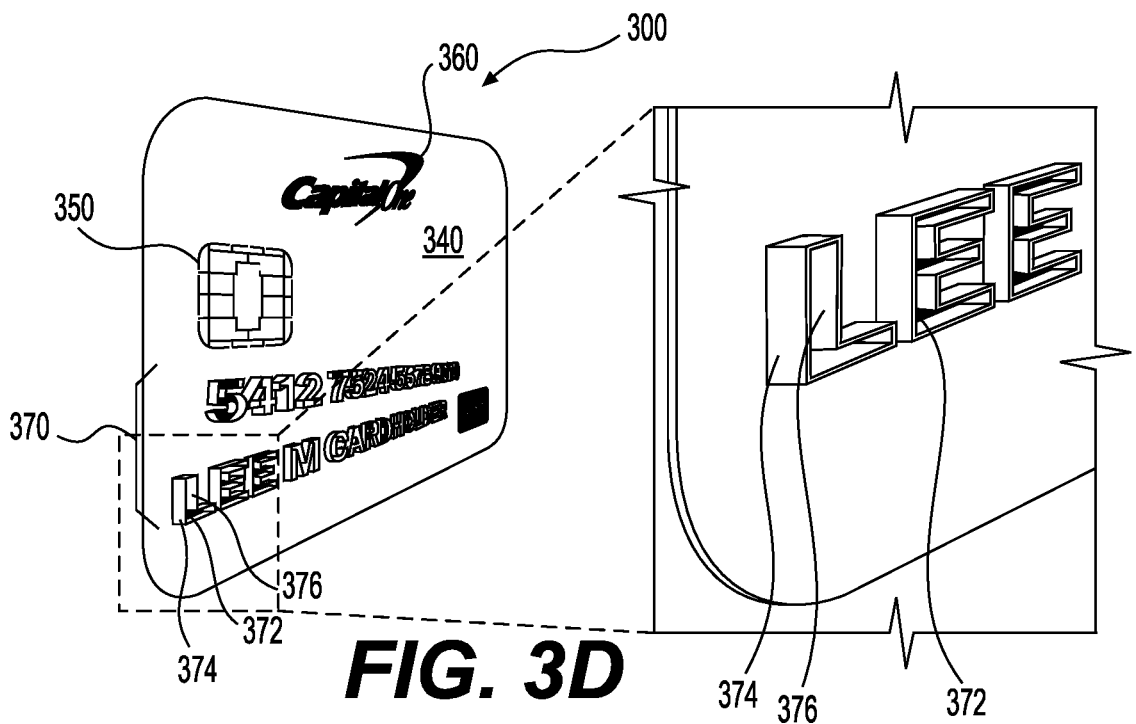

FIG. 3D illustrates a zoomed in portion of embossed characters 370 in order to illustrate this protruding lip feature. This feature provides an added benefit of security by physically shielding portions of sensitive information displayed in embossed characters 370 from certain vantage points. That is, while a cardholder would be able to easily view sensitive information displayed on physical card 300 from a 90-degree vantage point (FIG. 3A), unauthorized persons viewing physical card 300 from other angles (FIGS. 3B-3C) would be shielded from viewing at least portions of sensitive information by outer side surfaces 374 and inner side surfaces 376 of embossed characters 370.

This feature also provides an added benefit of security depending on in what color and/or material outer side surfaces 374 and inner side surfaces 376 are primarily formed relative to, e.g., background 340 and front surfaces 372. For example, in FIGS. 3A-3D, background 340, outer side surfaces 374, and inner side surfaces 376 are formed primarily in white. Front surfaces 372, however, are formed primarily in black. This color contrast also helps to shield portions of sensitive information displayed in embossed characters 370 as, in this example, background 340, outer side surfaces 374, and inner side surfaces 376 appear to blend together from certain vantage points, while also shielding portions of the contrasting front surfaces 372.

FIGS. 4A-4D provide another example of a physical card 400 configured to selectively limit visibility of sensitive information on the card surface. For purposes of this embodiment, it should be understood that many of the features of physical card 400 are similar to those of physical cards 200 and 300. That is, physical card 400 may also include a front surface 410, a back surface 420, one or more side surfaces 430, a background 440, a computer-readable chip 450, one or more non-embossed characters 460, a plurality of embossed characters 470, each having front surfaces 472, outer side surfaces 474, and inner side surfaces 476, embossed characters 480 that are a subset of embossed characters 470, and a magnetic strip, as described above with respect to FIGS. 2A-2D and 3A-3D.

As described with respect to FIGS. 2A-2D, FIGS. 4A-4D also provide an additional technique for selectively limiting the visibility of sensitive information on physical card 400. That is, embossed characters 480, or features thereof, may be formed primarily in a different color and/or material with respect to one or more other features of physical card 400, e.g., background 440, embossed characters 470, etc. For example, in FIGS. 4A-4D, background 440, front surfaces 472 and side surfaces 474 of embossed characters 470, and side surfaces 484 of embossed characters 480 are formed primarily in white. Front surfaces 482 of embossed characters 480, however, are formed primarily in black. This embodiment provides similar benefits of added security as those described with respect to FIGS. 2A-2D and 3A-3D.

Figure 4A:
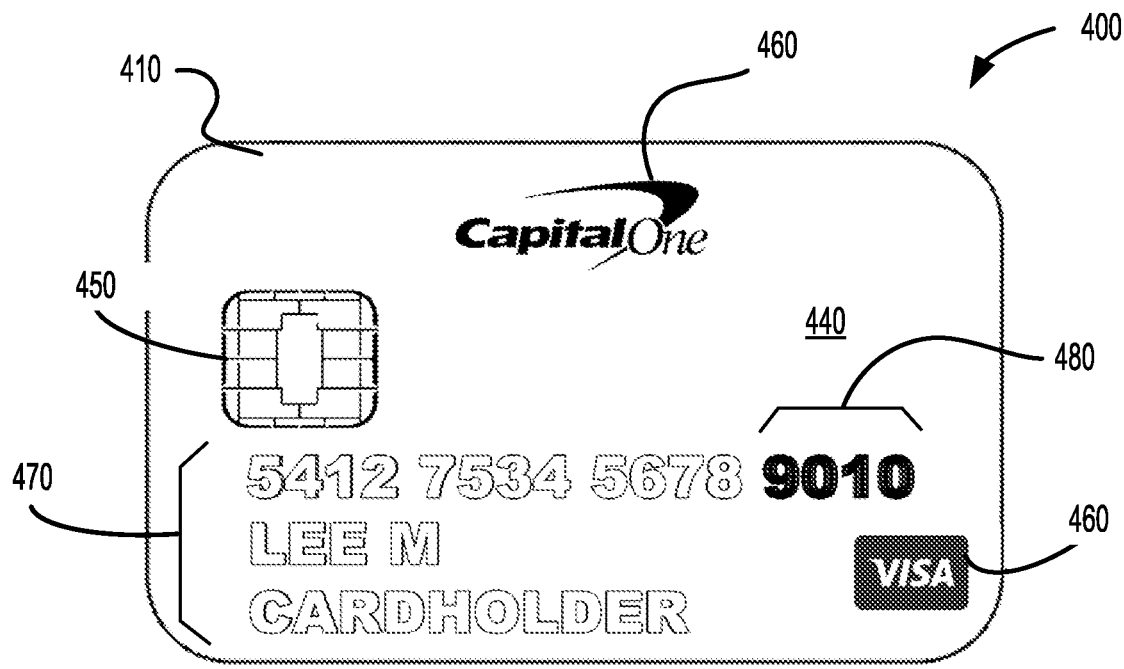
FIGS. 4A-4D show another example of a physical card configured to selectively limit visibility of sensitive information on the card surface, in accordance with one or more aspects of the disclosure.
Figure 4B:
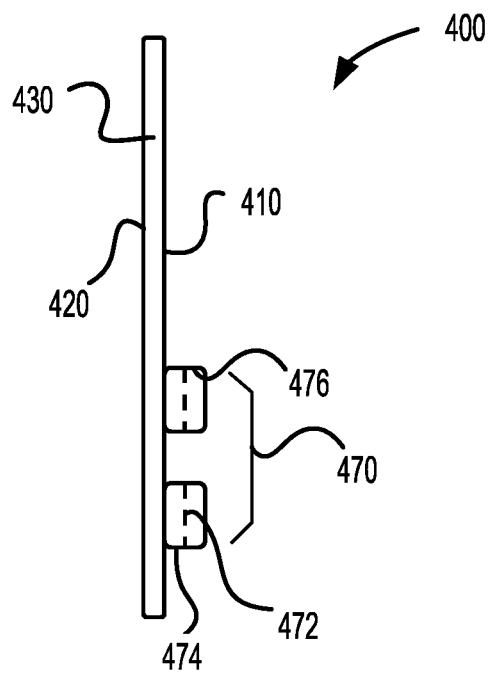
Figure 4C:
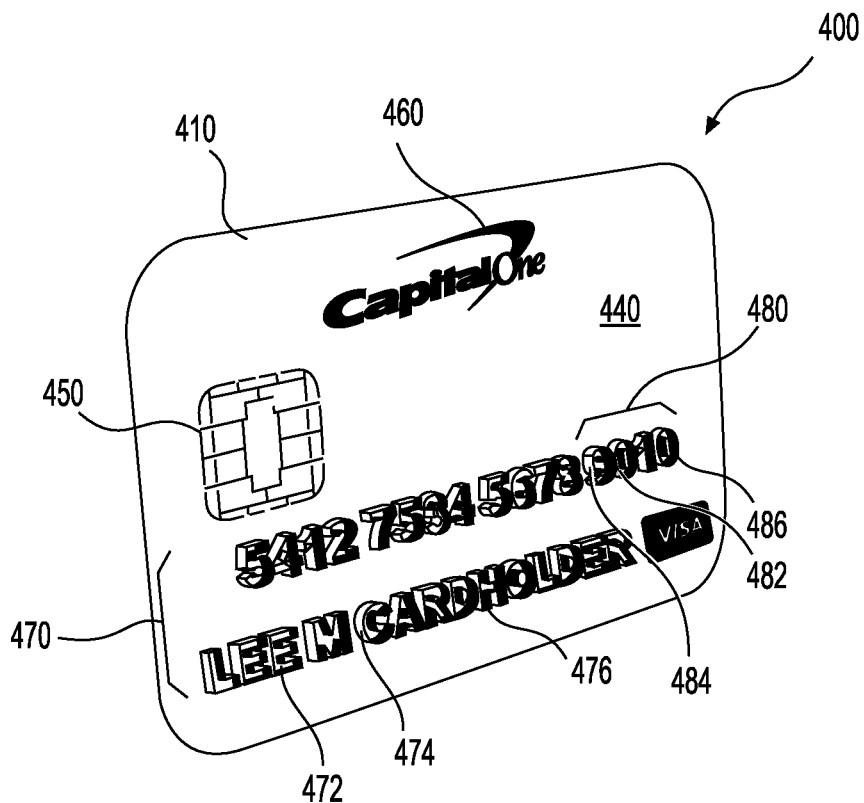
Figure 4D:
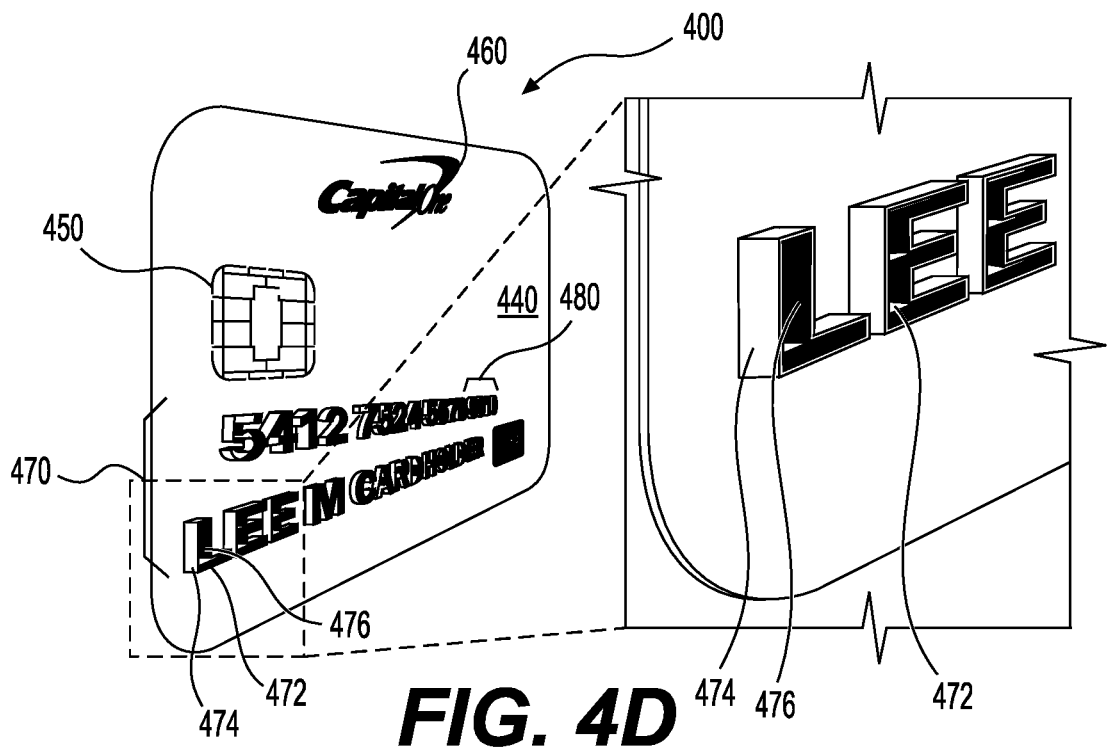
Figure 5:
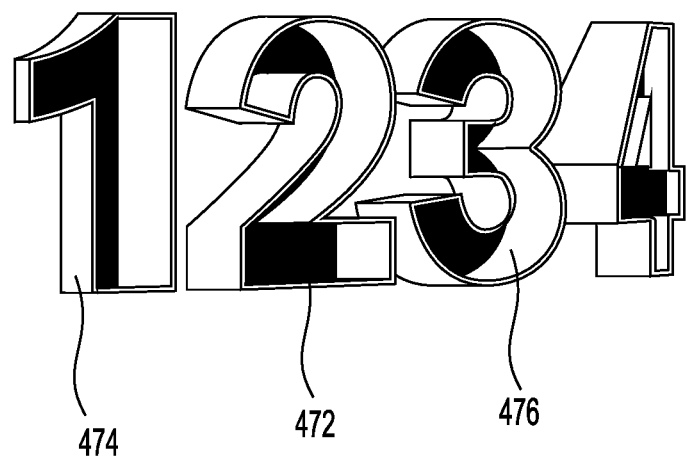
FIG. 5 shows an example technique for selectively limiting visibility of sensitive information on a card surface, in accordance with one or more aspects of the disclosure.

FIG. 5 provides yet additional techniques for selectively limiting the visibility of sensitive information on a physical card, e.g., physical card 400. It should be understood that the techniques illustrated in FIG. 5 may be incorporated with respect to any physical card (e.g., 100, 200, 300, 400). One such technique provides that physical card 400 may include front surfaces 472 of embossed characters 470 (and/or front surfaces 482 of embossed characters 480) that are formed non-parallel, i.e., angled, with respect to the card background. For example, FIG. 5 provides four digits "1234" of, e.g., a card number, that each may include a front surface 472 uniquely angled relative to background 440. Optionally, each grouping of embossed characters may be formed uniquely angled with respect to the card background. For example, in FIGS. 4A-4D, front surfaces 472 of the first four card digits "5412" may be angled, e.g., 30-degrees, front surfaces 472 of the second four card digits "7534" may be angled, e.g., 150-degrees, etc., relative to background 440.

Another such technique illustrated in FIG. 5 provides that physical card 400 may include the lips around embossed characters 470 (and/or 480) that are skewed relative to one another in order to further limit viewing of sensitive information displayed on physical card 400 from non-optimal viewing angles. For example, the lip around digit "1" is oriented shorter on its left side, while taller on its right side. Meanwhile, the lip around digit "4" is oriented shorter on its right side, while taller on its left side. The lips around digits "2" and "3," however, are not skewed, i.e., both right and left sides are oriented at equivalent heights. This technique, as described above, may also be included on either individual characters or groupings of characters. As described above with respect to other embodiments, the techniques illustrated in FIG. 5 once again provide an added benefit of security by limiting viewing of sensitive information displayed on the physical card from non-optimal viewing angles.

Figure 6:
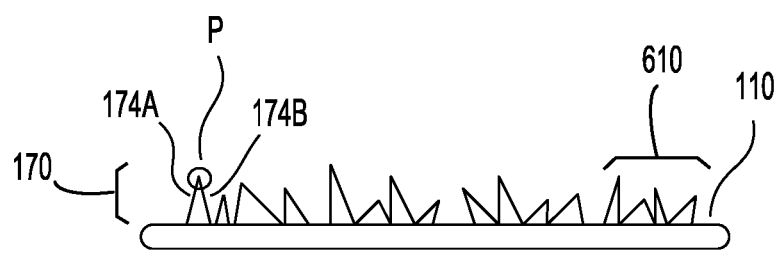
FIG. 6 shows another example technique for selectively limiting visibility of sensitive information on a card surface, in accordance with one or more aspects of the disclosure.

FIG. 6 also provides additional techniques for selectively limiting the visibility of sensitive information on a physical card, e.g., physical card 100 or 200. FIG. 6, however, provides a variation to physical card 100 or 200 by not including front surfaces 172 or 272 (as shown in FIGS. 1A-1D and 2A-2D, respectively). For example, FIG. 6 provides that physical card 100 may include the plurality of embossed characters 170 on physical card 100's front surface 110, wherein each of the embossed characters of the plurality of embossed characters 170 comprises side surfaces 174A and 174B that meet at a point P, rather than extending straight upwards to form the one or more front surfaces 172 or 272 (as shown in FIGS. 1A-1D and FIGS. 2A-2D, respectively). FIG. 6 alternatively provides that each embossed character of the plurality of embossed characters 170 may comprise a side surface 174A, a side surface 174B, and a point P. For example, FIG. 6 provides an embossed character grouping 610 that may comprise, e.g., the last four digits of a card number (e.g., "9010" as shown in FIGS. 1A-1D). Each side surface 174A and 174B may be angled differently with respect to one another, and each point P may be situated at different heights with respect to one another in relation to physical card 100's front surface 110. These additional techniques once again provide the added benefit of security by limiting viewing of sensitive information displayed on the physical card from non-optimal viewing angles.

By providing a physical card and supporting techniques for selectively limiting visibility of sensitive information displayed on the card, the sensitive information is better protected from unauthorized persons.

Exemplary Use Cases

The following exemplary use cases describe examples of a typical user flow pattern. They are intended solely for explanatory purposes and not to limit the disclosure in any way.

Figure 1B:
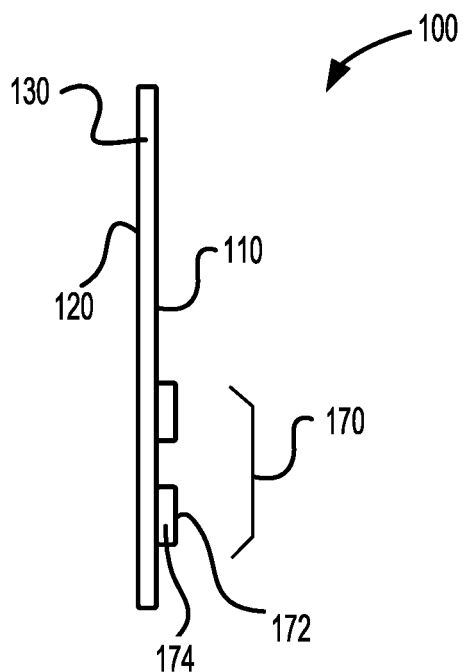
Figure 1C:
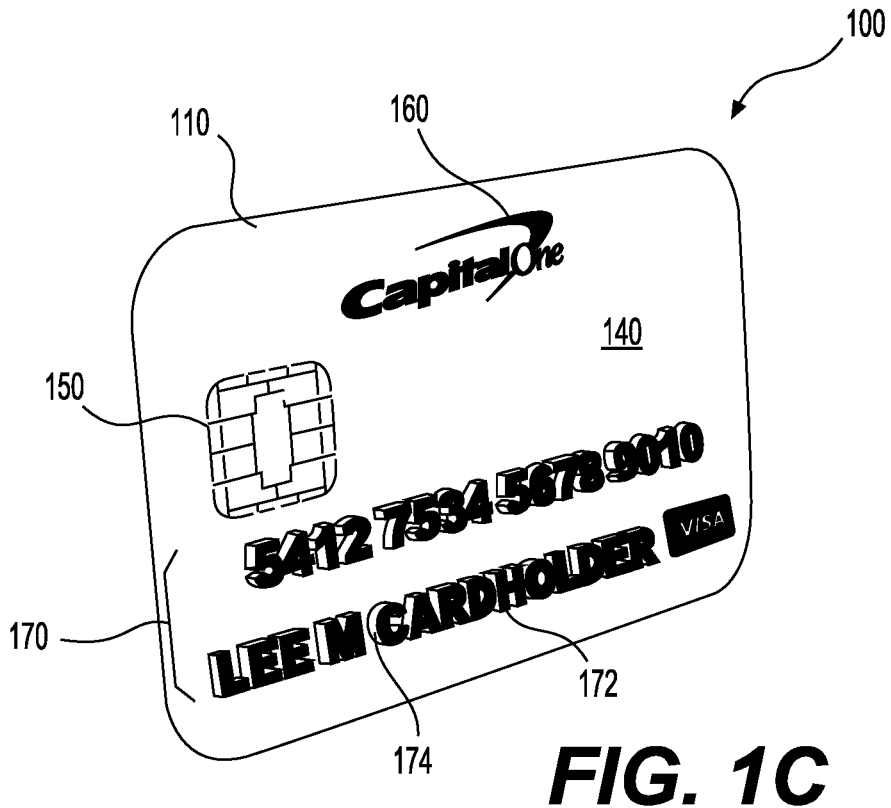
Figure 1D:
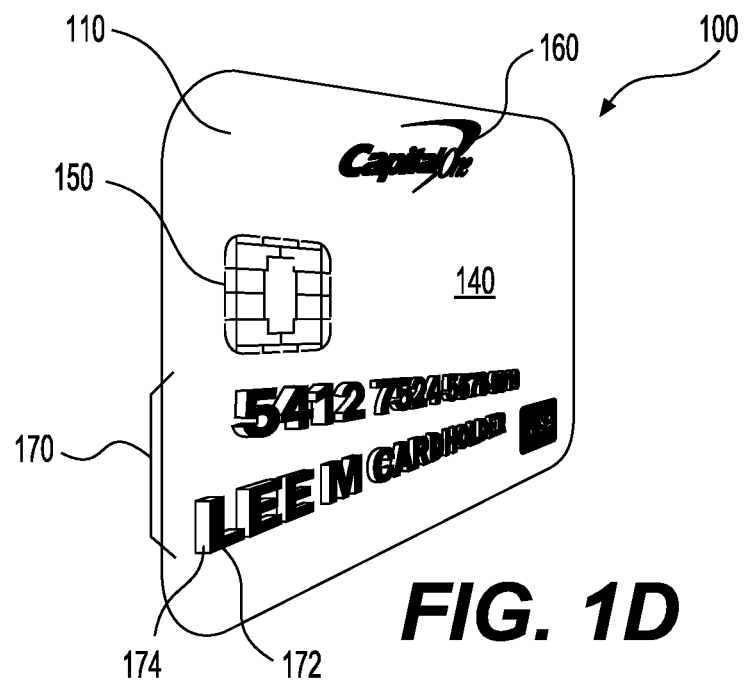
Figure 2A:
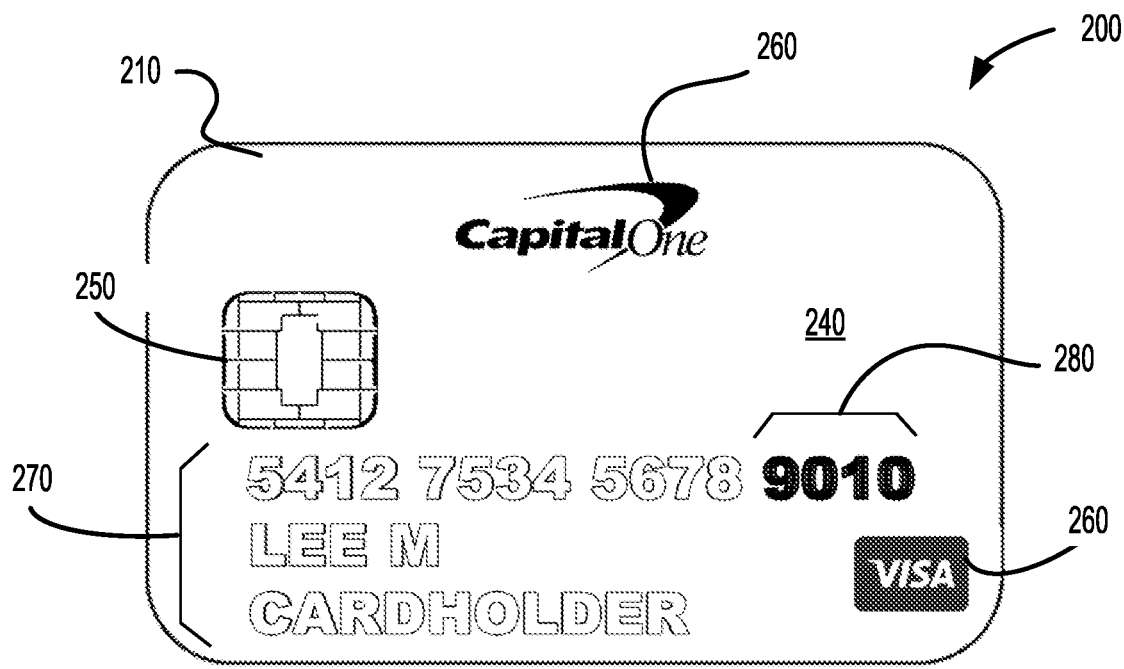
FIGS. 2A-2D show another example of a physical card configured to selectively limit visibility of sensitive information on the card surface, in accordance with one or more aspects of the disclosure.
Figure 2B:
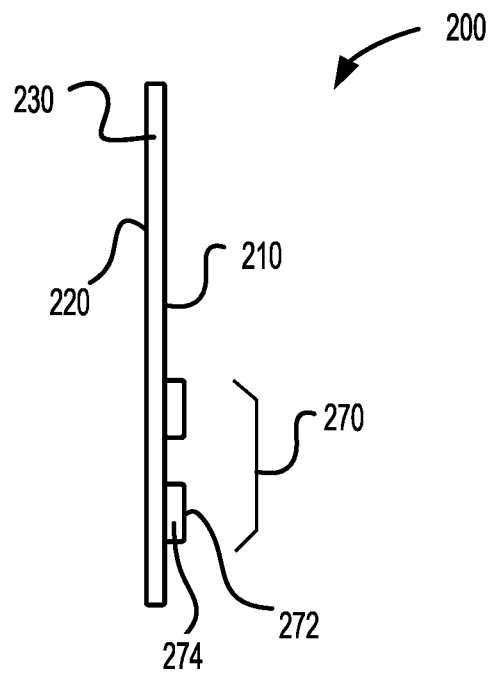
Figure 2C:
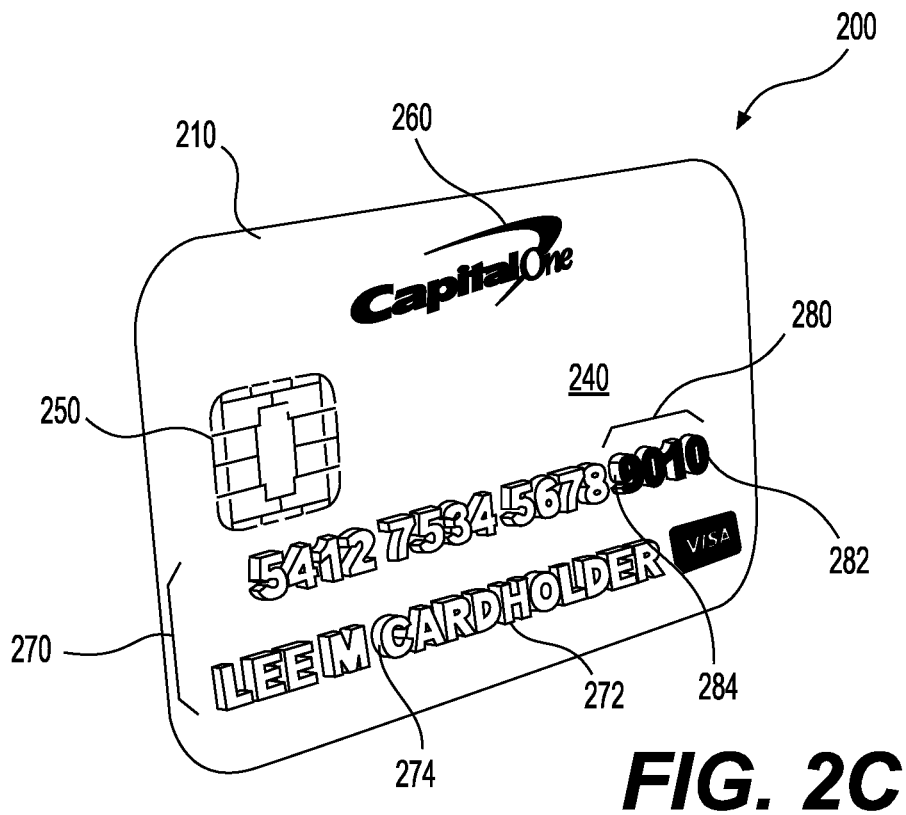
Figure 2D:
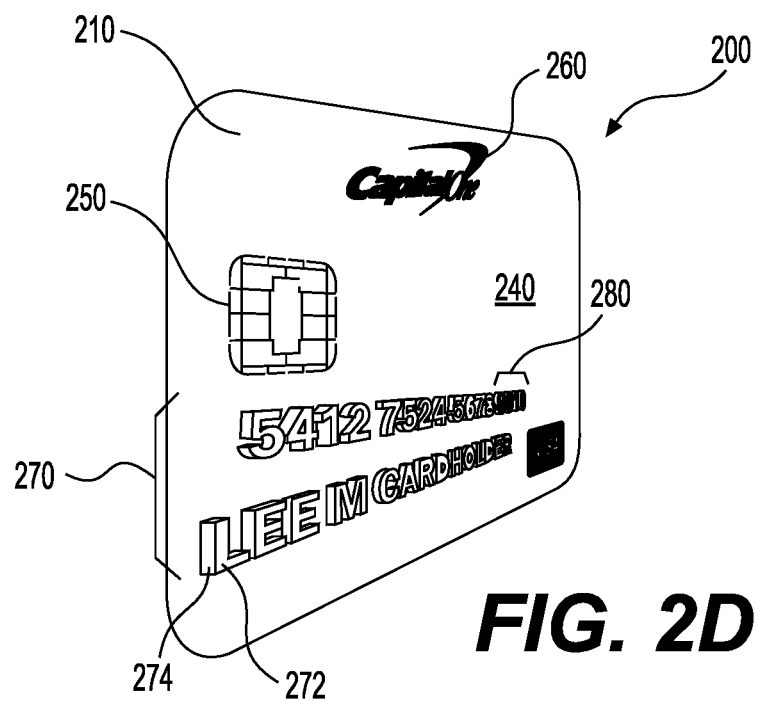

In one exemplary use case, a user may be equipped with a physical card (e.g., physical card 100). The user may wish to use the physical card to make a transaction in a public place, for example, purchasing groceries in a grocery store. As the user makes the transaction with physical card 100 (e.g., by taking the card out of the user's pocket and inserting it into the store's point-of-sale (POS) terminal), unauthorized persons standing in line behind the user would have difficulty viewing any sensitive information displayed on physical card 100 (e.g., card number, cardholder name, etc.). That is, because side surfaces 174 and background 140 are formed primarily in white, these features of physical card 100 would blend together, making it difficult for unauthorized persons standing at non-optimal viewing angles to read sensitive information included in embossed characters 170 (e.g., as illustrated in FIGS. 1B-1D). By providing a physical card wherein sensitive information is displayed via embossed characters and color blending and/or contrast, the user can ensure the sensitive information cannot be easily viewed by unauthorized persons standing in line behind the user in the grocery store.

In another exemplary use case, a user may be equipped with a physical card (e.g., physical card 300). The user may wish to use the physical card to make a transaction in a public place, for example, paying for a meal in a restaurant. After obtaining the bill from the restaurant server, the user may place the card on top of the table while waiting for the server to come collect the card for processing. Unauthorized persons sitting at nearby tables or walking by the user's table would have difficulty viewing any sensitive information displayed on physical card 300 (e.g., card number, cardholder name, etc.). That is, outer side surfaces 374 and inner side surfaces 376 of embossed characters 370 would shield at least portions of the sensitive information displayed on physical card 300 from persons sitting or standing at non-optimal viewing angles (e.g., as illustrated in FIGS. 3B-3D). Further, because outer side surfaces 374 and inner side surfaces 376 are formed primarily in white, they would also help to limit visibility of sensitive information by blending in with background 340. By providing a physical card wherein sensitive information is displayed via embossed characters having protruding edges or lips, and color blending and/or contrast, the user can ensure the sensitive information cannot be easily viewed by unauthorized persons sitting at nearby tables or walking past the user's table.

In another exemplary use case, a user may be equipped with a physical card (e.g., physical card 400). The user may wish to use the physical card to identify him or herself in a public place, for example, to a merchant selling alcoholic beverages to the user. The user may hand physical card 400 to the merchant, the merchant being an authorized person, in order for the merchant to verify the user's date of birth. Unauthorized persons standing in line behind the user would have difficulty viewing any sensitive information displayed on physical card 400 (e.g., the user's name, address, date of birth, etc.). That is, outer surfaces 474 and inner surfaces 476 of embossed characters 470, and outer surfaces 484 and inner surfaces 486 of embossed characters 480, would shield at least portions of the sensitive information displayed on physical card 400 from persons standing at non-optimal viewing angles (e.g., as illustrated in FIGS. 4B-4D). Further, because one or more features of embossed characters 470 and 480 may be formed primarily in white, they would also help to limit visibility of sensitive information by blending in with background 440 which also may be formed primarily in white. By providing a physical card wherein sensitive information is displayed via embossed characters having protruding edges or lips, and color blending and/or contrast, the user can ensure the sensitive information cannot be easily viewed by unauthorized persons standing in line behind the user in the merchant's store.

The disclosed embodiments are directed to physical cards and supporting techniques for selectively limiting visibility of sensitive information displayed on physical cards. Consistent with the disclosed embodiments, a physical card may have a substantially planar body that is bounded by a continuous peripheral edge. The body may include a front surface, a back surface, and one or more side surfaces. The card's front surface may include a background formed primarily in a first color, and a plurality of embossed characters. Each embossed character may have one or more front surfaces aligned substantially in parallel relative to the background and one or more side surfaces extending from the background at a lower edge to the front surface at an upper edge. The one or more front surfaces of at least a first embossed character of the plurality of embossed characters may be formed primarily in a second color different from the first color. The one or more side surfaces of at least the first embossed character may be formed primarily in the first color to limit a viewing angle of the plurality of embossed characters.

In another aspect, a transaction card associated with an account may have a substantially planar body. The body may include a front surface, a back surface, and one or more side surfaces. The card's front surface may include a background formed primarily in a first color, and a plurality of human-readable embossed characters. Each embossed character may have one or more front surfaces aligned substantially in parallel relative to the background. Each embossed character may also have one or more outer side surfaces extending from an outer lower edge proximate the background to an upper edge of a lip protruding beyond the front surfaces of the plurality of embossed characters and formed in the first color. Each embossed character may also have one or more inner side surfaces extending from an inner lower edge proximate the one or more front surfaces of the plurality of embossed characters to the upper edge of the lip and formed in a second color different from the first color.

In another aspect, a transaction card may have a substantially planar body. The body may include a front surface, a back surface, and one or more side surfaces. The card's front surface may include a background formed primarily in a first color, and a plurality of embossed characters. Each embossed character may have one or more front surfaces, and one or more outer side surfaces extending from an outer lower edge proximate the background to an upper edge of a lip protruding beyond the front surfaces of the plurality of embossed characters and formed in the first color. Each embossed character may also have one or more inner side surfaces extending from an inner lower edge proximate the one or more front surfaces of the plurality of embossed characters to the upper edge of the lip and formed in a second color different from the first color.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although certain specific aspects of various example embodiments have been described, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. Thus, embodiments disclosed should be considered in all respects as examples and not restrictive. Accordingly, the scope of the inventions herein should be determined not by the embodiments illustrated, but by the appended claims and their equivalents.

In the present description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Also, in describing example embodiments, certain terminology is used for the sake of clarity. It is intended that each term contemplates its broadest meaning as understood by those skilled in the art and includes all technical equivalents that operate in a similar manner to accomplish a similar purpose.

While certain embodiments of the disclosed technology have been described, it is to be understood that the disclosed technology is not to be limited to the disclosed example embodiments, but covers various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and to enable any person skilled in the art to practice the disclosed technology, including making and using any devices or systems and performing any incorporated methods. The patentable scope may include other examples that occur to those skilled in the art. Such other examples are intended to be within the scope of the claims if they have structural elements as the claims, or if they include equivalent structural elements with insubstantial differences from the literal language of the claims.

We claim:

1. A physical card comprising:
   a substantially planar body bounded by a continuous peripheral edge, the body comprising a front surface, a back surface, and one or more side surfaces, the front surface comprising:
      a background formed primarily in a first color; and
      a plurality of embossed characters each having one or more front surfaces aligned substantially in parallel relative to the background and one or more second side surfaces extending from the background at a lower edge to the front surface at an upper edge, wherein the one or more front surfaces of at least a first embossed character of the plurality of embossed characters are formed primarily in a second color different from the first color and the one or more second side surfaces of at least the first embossed character are formed primarily in the first color to limit a viewing angle of the plurality of embossed characters, wherein the one or more front surfaces form one or more characters, the one or more second side surfaces protrude beyond the one or more front surfaces, and the one or more front surfaces are visible from a first angle and obscured from a second angle that is different from the first angle.

2. The physical card of claim 1, wherein the front surface of the body further comprises one or more merchant identifiers and a plurality of non-embossed characters.

3. The physical card of claim 2, wherein the plurality of non-embossed characters are formed primarily in the second color.

4. The physical card of claim 3, wherein the plurality of embossed characters comprise sensitive information and the plurality of non-embossed characters comprise non-sensitive information.

5. The physical card of claim 4, wherein the background comprises a lenticular print such that a first design of the lenticular print is viewable from a first viewing angle and a second design of the lenticular print is viewable from a second viewing angle, and the one or more second side surfaces of at least the first embossed character comprise the lenticular print.

6. The physical card of claim 1, wherein the one or more second side surfaces of at least the first embossed character extend beyond the respective one or more front surfaces of at least the first embossed character to form one or more lips, the one or more lips having an outer surface formed primarily in the second color.

7. The physical card of claim 6, wherein the one or more lips have an inner surface formed primarily in a third color.

8. The physical card of claim 1, wherein the one or more second side surfaces of the plurality of embossed characters comprise a first material and the one or more front surfaces of the plurality of embossed characters comprise a second material having one or more different visual properties from the first material.

9. The physical card of claim 8, wherein the one or more different visual properties comprise transparency, translucency, and reflectiveness.

10. The physical card of claim 8, wherein the background comprises the first material.

11. The physical card of claim 8, wherein the second material is configured to allow human visible light to pass through a thickness of the second material extending from the back surface of the physical card to the front surface of the physical card without being absorbed.

12. A transaction card associated with an account, the card comprising:
a substantially planar body having a front surface, a back surface, and one or more side surfaces, the front surface of the card comprising:
a background formed primarily in a first color;
a plurality of human-readable embossed characters each having:
one or more front surfaces aligned substantially in parallel relative to the background;
one or more outer side surfaces extending from an outer lower edge proximate the background to an upper edge of a lip protruding beyond the front surfaces of the plurality of embossed characters and formed in the first color; and
one or more inner side surfaces extending from an inner lower edge proximate the one or more front surfaces of the plurality of embossed characters to the upper edge of the lip and formed in a second color different from the first color,
wherein the one or more front surfaces form one or more characters, and the one or more front surfaces are visible from a first angle and obscured from a second angle that is different from the first angle.

13. The transaction card of claim 12, wherein the one or more front surfaces of the plurality of embossed characters are formed in the first color, the card further comprising a computer-readable chip and a magnetic strip.

14. The transaction card of claim 12, wherein the one or more front surfaces of the plurality of embossed characters are formed in the second color, the card further comprising a computer-readable chip and a magnetic strip.

15. The transaction card of claim 12, wherein the front surface of the card further comprises one or more merchant identifiers and a plurality of non-embossed characters formed primarily in the second color and comprising sensitive information, and the plurality of non-embossed characters comprise non-sensitive information.

16. A transaction card comprising:
a substantially planar body having a front surface, a back surface, and one or more side surfaces, the front surface comprising:
a background formed primarily in a first color;
a plurality of embossed characters each having:
one or more front surfaces;
one or more outer side surfaces extending from an outer lower edge proximate the background to an upper edge of a lip protruding beyond the front surfaces of the plurality of embossed characters and formed in the first color; and
one or more inner side surfaces extending from an inner lower edge proximate the one or more front surfaces of the plurality of embossed characters to the upper edge of the lip and formed in a second color different from the first color,
wherein the one or more front surfaces form one or more characters, and the one or more front surfaces are visible from a first angle and obscured from a second angle that is different from the first angle.

17. The transaction card of claim 16, wherein the one or more front surfaces of the plurality of embossed characters comprise a first set of front surfaces aligned at a first non-parallel angle relative to the background and a second set of front surfaces aligned at a second non-parallel angle relative to the background, the first non-parallel angle differing from the second non-parallel angle such that the entirety of the one or more front surfaces of the plurality of embossed characters are not readable from a single vantage point.

18. The transaction card of claim 16, wherein the one or more front surfaces of the plurality of embossed characters are formed in the first color, the card further comprising a computer-readable chip and a magnetic strip.

19. The transaction card of claim 16, wherein the one or more front surfaces of the plurality of embossed characters are formed in the second color, the card further comprising a computer-readable chip and a magnetic strip.

20. The physical card of claim 6, wherein the one or more lips are skewed relative to one another.

* * * * *